(12) United States Patent
Paasch

(10) Patent No.: US 9,259,982 B2
(45) Date of Patent: Feb. 16, 2016

(54) CURRENCY OPERATED TIRE INFLATION AND REPAIR APPARATUS AND METHODS

(71) Applicant: Robert W. Paasch, Homedale, ID (US)

(72) Inventor: Robert W. Paasch, Homedale, ID (US)

(73) Assignee: Consumer Products International LLC., Wilder, ID (US)

( * ) Notice: Subject to any disclaimer, the term of this patent is extended or adjusted under 35 U.S.C. 154(b) by 331 days.

(21) Appl. No.: 13/835,369

(22) Filed: Mar. 15, 2013

(65) Prior Publication Data

US 2014/0099428 A1     Apr. 10, 2014

Related U.S. Application Data

(60) Provisional application No. 61/710,649, filed on Oct. 5, 2012.

(51) Int. Cl.
| | | |
|---|---|---|
| *B60C 25/00* | (2006.01) | |
| *B60S 5/04* | (2006.01) | |
| *B29C 73/16* | (2006.01) | |
| *B29L 30/00* | (2006.01) | |

(52) U.S. Cl.
CPC ............... *B60C 25/16* (2013.01); *B29C 73/166* (2013.01); *B60S 5/046* (2013.01); *B29L 2030/00* (2013.01)

(58) Field of Classification Search
CPC .......... B60S 5/04; B60C 19/12; B29C 73/166
USPC ....................... 141/38, 82, 104, 105; 152/509
See application file for complete search history.

(56) References Cited

U.S. PATENT DOCUMENTS

| | | | | |
|---|---|---|---|---|
| 700,796 | A | | 5/1902 | Molyneux |
| 4,115,172 | A | | 9/1978 | Baboff et al. |
| 4,281,621 | A | | 8/1981 | Tacke et al. |
| 4,798,233 | A | * | 1/1989 | Mooney ........................ 141/38 |
| 5,518,021 | A | | 5/1996 | Loureiro Benimeli |
| 5,588,984 | A | | 12/1996 | Verini |
| 5,857,417 | A | * | 1/1999 | Hart ............................. 109/55 |
| 5,908,145 | A | | 6/1999 | Jaksa |

(Continued)

FOREIGN PATENT DOCUMENTS

| | | |
|---|---|---|
| EP | 1358996 | 11/2002 |
| JP | 2010-036509 | 2/2010 |

OTHER PUBLICATIONS

WO PCT/US2013/063746 Search Rept., Jan. 6, 2014, Paasch.

(Continued)

*Primary Examiner* — Timothy L Maust
(74) *Attorney, Agent, or Firm* — Wells St. John P.S.

(57) ABSTRACT

The present disclosure provides tire repair assemblies that can include: a tire sealant tank; an air assembly coupled to the tire sealant tank; a valve configured to control fluid communication between the tank and the air assembly; and a currency operating assembly configured to control the valve. Methods for repairing tires are also provided with the methods including providing tire sealant to a tire from a tire repair assembly upon depositing currency in the tire repair assembly. A stand alone currency operated tire repair assemblies are also provided with the assemblies including: a tire sealant tank; an air compressor operatively coupled to the tank; a valve operatively aligned between the tank and the air compressor; a flow meter operatively aligned between the tank and the air compressor; and computer processing circuitry operatively coupled to the air compressor, the valve, and the flow meter.

20 Claims, 3 Drawing Sheets

(56) References Cited

U.S. PATENT DOCUMENTS

| | | | |
|---|---|---|---|
| 5,957,329 A * | 9/1999 | Kenney et al. | 222/1 |
| 6,176,285 B1 * | 1/2001 | Gerresheim et al. | 152/509 |
| 6,283,172 B1 | 9/2001 | Thurner | |
| 6,412,524 B1 | 7/2002 | Fogal, Sr. | |
| 6,789,581 B2 | 9/2004 | Cowan et al. | |
| 7,021,348 B2 | 4/2006 | Eriksen et al. | |
| 7,178,564 B2 | 2/2007 | Kojima et al. | |
| 7,287,565 B2 * | 10/2007 | Hottebart et al. | 152/416 |
| 7,694,698 B2 | 4/2010 | Marini | |
| 7,798,183 B2 * | 9/2010 | Cegelski et al. | 141/38 |
| 7,891,385 B2 | 2/2011 | Yanagi et al. | |
| 7,926,521 B2 * | 4/2011 | Izumoto et al. | 141/105 |
| 8,474,491 B2 * | 7/2013 | Lachman | 141/38 |
| 2004/0149391 A1 * | 8/2004 | Shaffer | 156/404 |
| 2006/0278496 A1 | 12/2006 | Perry | |
| 2008/0060734 A1 | 3/2008 | Stehle | |
| 2008/0257695 A1 | 10/2008 | Hickman | |
| 2009/0218005 A1 | 9/2009 | Stehle | |
| 2010/0147416 A1 | 6/2010 | Chou | |

OTHER PUBLICATIONS

WO PCT/US2013/063746 Writ. Opin., Jan. 6, 2014, Paasch.
WO PCT/US2013/063746 IPRP, Apr. 7, 2015, Robert W. Paasch.

* cited by examiner

CURRENCY OPERATED TIRE INFLATION AND REPAIR APPARATUS AND METHODS

CROSS REFERENCE TO RELATED APPLICATION

This application claims priority to U.S. Provisional Patent Application Ser. No. 61/710,649 which was filed on Oct. 5, 2012, the entirety of which is incorporated by reference herein.

TECHNICAL FIELD

The present disclosure relates to tire inflation repair assemblies and methods, and in particular embodiments, currency operated fluid addition and tire repair assemblies and methods.

BACKGROUND

Fluids that may be added to tires to repair leaks in tires are currently available. The present disclosure addresses the problem of providing these fluids at remote locations at a cost to the consumer, thereby alleviating the need for the consumer to store these fluids in a vehicle. The storage of these fluids can be difficult because the consumer is required to periodically exchange the fluids for other fluids that may be newer or fresher fluids. The present disclosure provides currency operated assemblies and methods for providing these fluids. The preparation of these assemblies and methods can be difficult for at least the reason that the fluids have a tendency to clog conduits that they may in for extended periods of time. Embodiments of the present disclosure provide methods and assemblies that overcome these problems.

SUMMARY

The present disclosure provides tire repair assemblies that can include: a tire sealant tank; an air assembly coupled to the tire sealant tank; a valve configured to control fluid communication between the tank and the air assembly; and a currency operating assembly configured to control the valve.

Methods for repairing tires are also provided with the methods including providing tire sealant to a tire from a tire repair assembly upon depositing currency in the tire repair assembly.

A stand alone currency operated tire repair assemblies are also provided with the assemblies including: a tire sealant tank; an air compressor operatively coupled to the tank; a valve operatively aligned between the tank and the air compressor; a flow meter operatively aligned between the tank and the air compressor; and computer processing circuitry operatively coupled to the air compressor, the valve, and the flow meter.

BRIEF DESCRIPTION OF THE DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
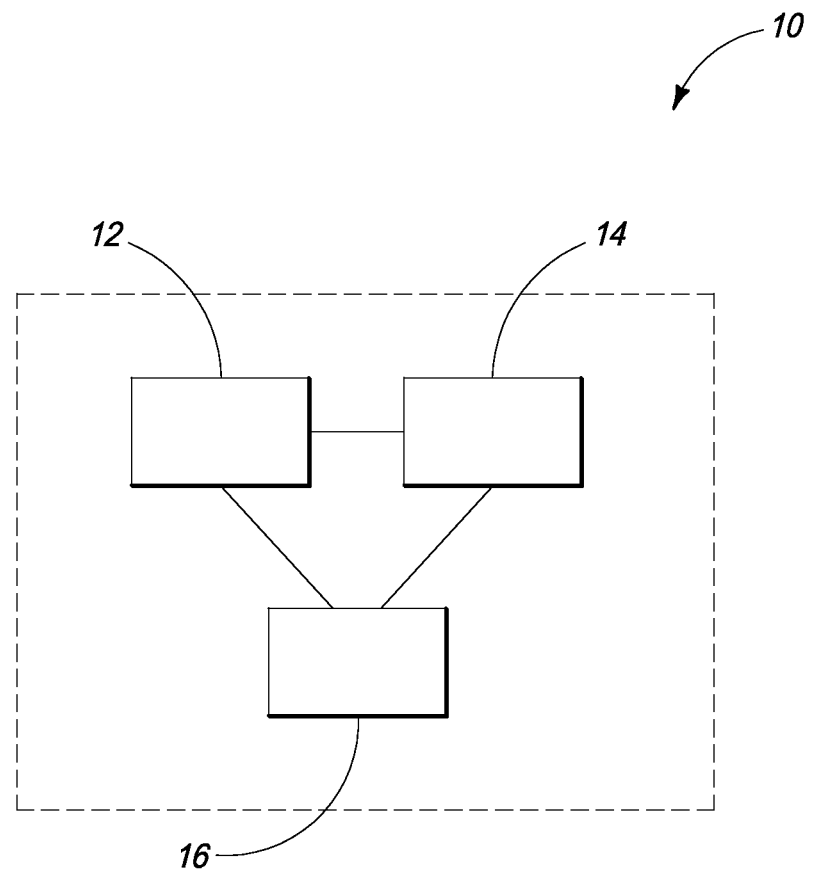
FIG. 1 is an assembly according to an embodiment of the disclosure.

The assemblies and methods of the present disclosure will be described with reference to FIGS. 1-3. Referring first to FIG. 1, an assembly 10 is shown that includes an air consolidation assembly 12. Air consolidation assembly 12 can be a motorized compressor, for example. It can also be a pressurized tank of air. The air that may be utilized may be pure oxygen, or air itself which is a mixture of oxygen, nitrogen, and carbon dioxide, for example. It may also be nitrogen, for example. This air supply 12 may be coupled to a valve assembly 16. Valve assembly 16 may be a solenoid valve that can be operated through mechanical and/or electrical means, for example. In accordance with example configurations, a mechanically operated solenoid valve may provide air from assembly 12 to fluid storage assembly 14. Fluid storage assembly 14 may be a tank or other container that may be constructed of, for example, metal or an inert plastic such as a polypropylene or polystyrene material. Fluid container 14 can contain a tire sealant, for example. The fluid can be, for example, liquid latex based, liquid rubber based, synthetic foaming agents and of varying viscus coagulating property's to seal punctures. Control of value 16 thereby providing air from assembly 12 through liquid container 14 can be manipulated through a user interface. The user interface may be mechanical and/or electrical. The user interface may be computer operated, for example, as well. The user interface may be configured to receive coins for operation or other currency, such as dollar bills. The user interface may also be configured to receive credit cards for operation as well. Upon initiation of the valve solenoid, air can be provided from air storage assembly 12 to fluid container 14, and fluid and air can be provided to a tire for re-inflation and/or repair, as desired. The tubing connecting air assembly 12 and the fluid assembly 14 as well as the tubing to the tire can be constructed of an inert material that does not facilitate the solidification of the sealant material in tank 14. In accordance with example configurations, the sequence of events can be started to facilitate the repair and/or filling of a tire. For example, upon initiation of operation of assembly 10, a slight amount of air can be added to the tire, and then the solenoid engaged to provide tire sealant to the tire, and then a desired amount of tire sealant or a predetermined amount of tire sealant is added followed by air being provided through the lines to the tire. In such a fashion, the lines exiting the assembly can be cleared of sealant for the next use.

Figure 2:
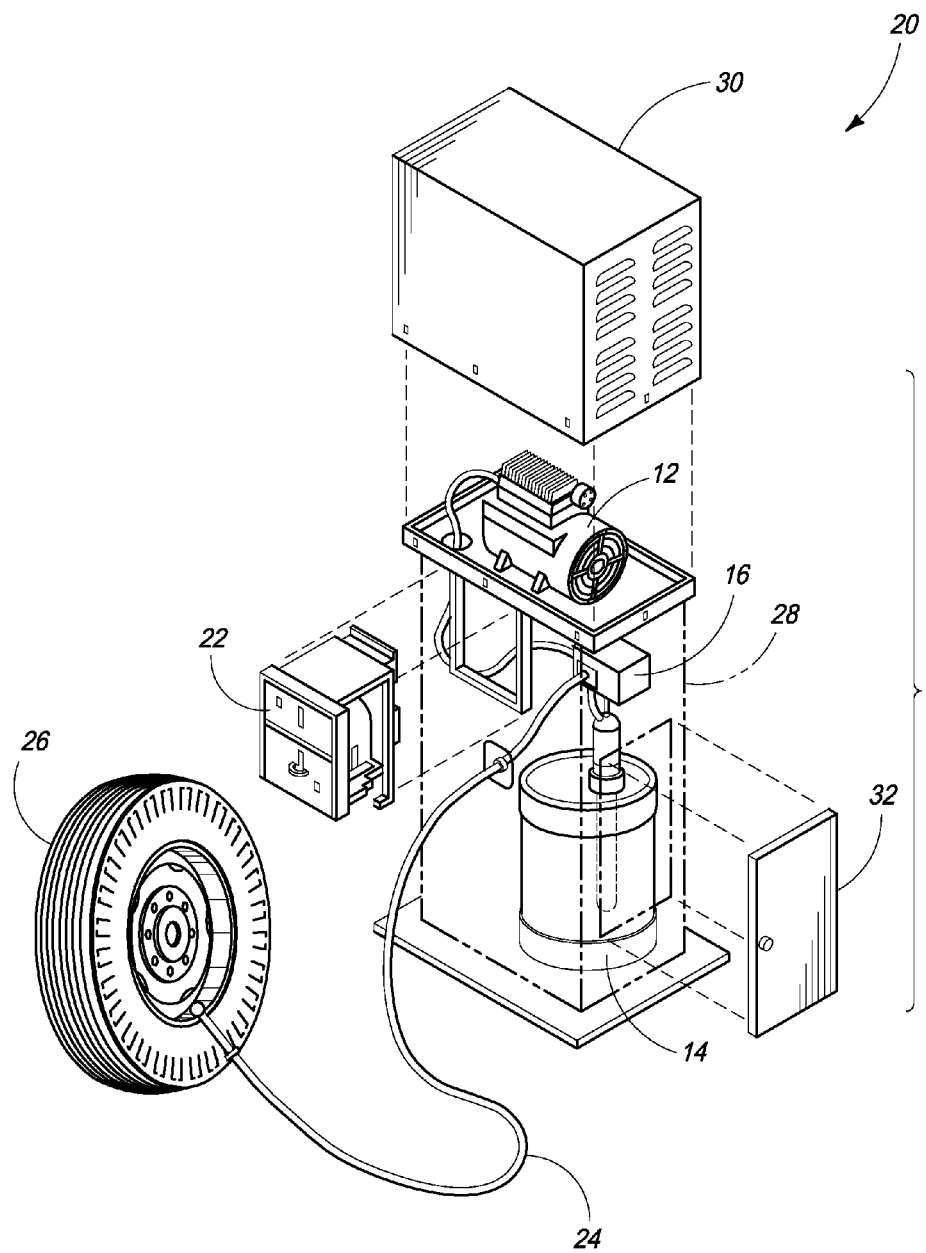
FIG. 2 is an assembly according to another embodiment of the disclosure.

Referring to FIG. 2, an assembly 20 is provided according to another embodiment. In accordance with example configurations, assembly 20 includes air assembly 12 which, as shown here, is an air compressor. Assembly 20 can include valve assembly 16 as well as tank assembly 14. Assembly 20 can also include interface 22. As shown here, interface 22 can be a coin operated interface. Assembly 20 can include a top cover 30 as well as a door panel 32 that may be connected to a housing 28 that encompasses a substantial number of assemblies within assembly 20. Assembly 20 can also include line 24 such as a tire hose that may be utilized to extend to a tire 26 for inflation.

As can be seen from assembly 20, repair maintenance access can be provided to different components of assembly 20 by design. For example, cover 30 can be removed from assembly 20 to allow access to air assembly 12 for repair and maintenance. Also, door 32 can be coupled to housing 28 to allow for repair and maintenance and/or refilling of tank 14.

According to example implementations, tank 14 can be a refillable tank that may not have hard side walls. It may be simply a bag with soft side walls that may be suspended in a tank. These tanks can have easy-clasp configurations or snap fits that allow for the quick release of the tank to the hardware of assembly 12. In accordance with example implementations, upon initiation of the repair and filling sequence, compressor 12 may be initiated for a few moments to build up sufficient pressure and air provided to tire 26, then at a predetermined time or desired time, valve 16 may be engaged to provide fluid from tank 14 through tubing 24 to tire 26. Upon a desired amount of time and/or an amount of fluid being provided to tire 26, a close down or cleaning sequence may be initiated, allowing for the removal of fluid from lines such as tire line 24.

Figure 3:
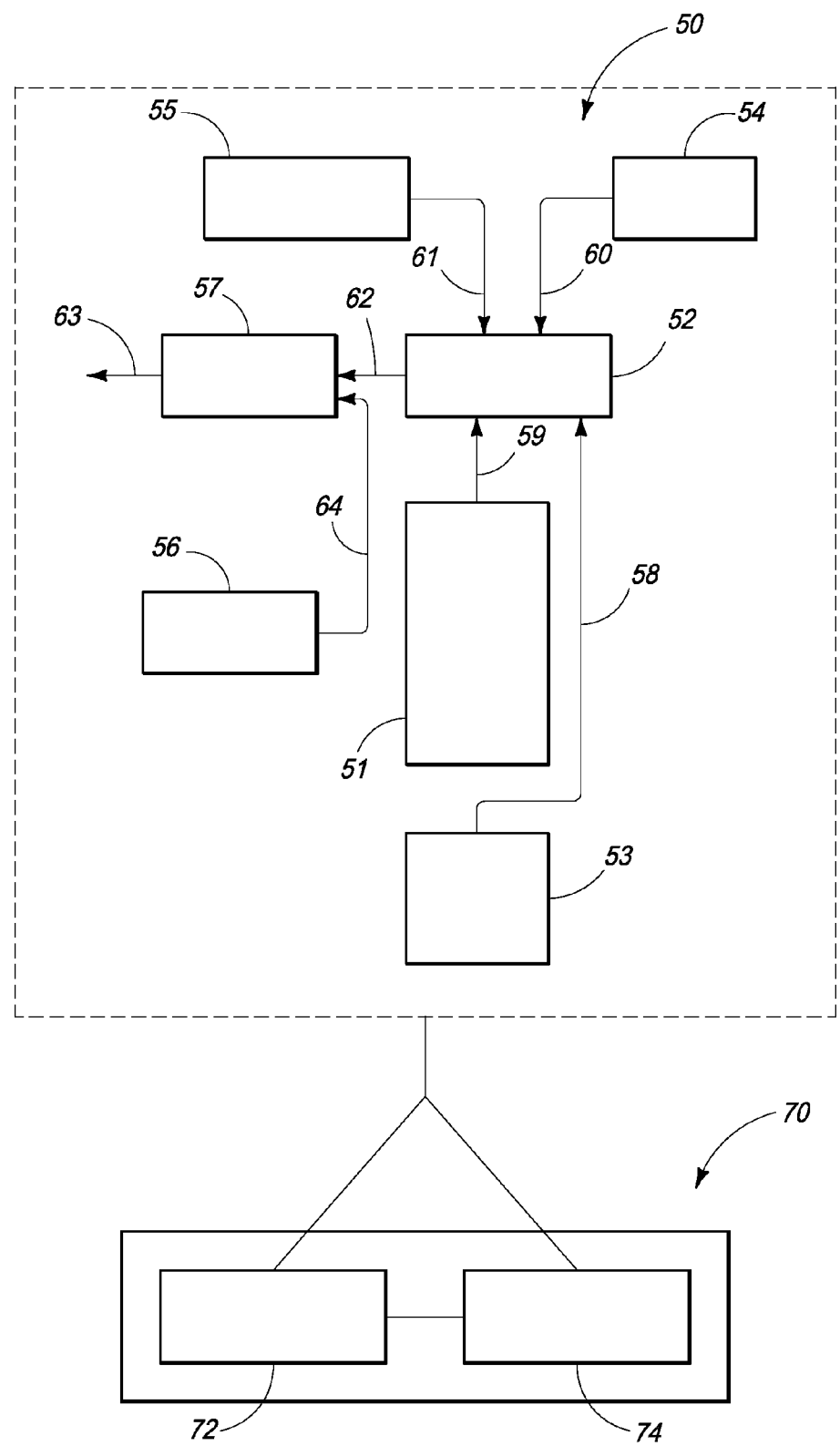
FIG. 3 is an operational schematic for use with the assembly of FIGS. 1 and/or 2 according to an embodiment.

Referring to FIG. 3, tire repair assembly 50 can include a tire sealant tank 51. Tank 51 can be configured as a product storage tank and may include a proprietary filling unit that only accepts manufacture/operator designed interfaces to discourage other non-approved sealants from being utilized. Tank 51 can contain a suspension of flakes and fine fibers in a liquid, and/or a natural or synthetic liquid rubber; example materials include latex materials.

Air assembly 52 such as a pressure unit that can include an air compressor such as diaphragm pump, piston or screw pump and/or air pressure pump, can be coupled to the tire sealant tank 51 via pressure unit product connection 59. Connections such as connection 59 can be used to operatively couple components of assembly 52. In this case the operatively coupling is fluid communication. In accordance with example implementations fluid communication between these components as well as all components in the assembly can be controlled by one or a combination of valves and/or flow meters.

As indicated herein assembly 50 can include a currency operating assembly. This operating assembly may be mechanically and/or electronically coupled to the one or more valves and/or flow meters operatively aligned along the fluid communication between components. In one example, the mechanical coupling can engage/disengage the valves and/or flow meters.

In accordance with another implementation, assembly 50 can include computer processing circuitry 70. Circuitry 70 can be configured/used to control valves and/or flow meters of assembly 50 as well as record/control other components of assembly 50. Circuitry 70 can include processing circuitry 72 as well as storage circuitry 74. Circuitry 70 may have a user interface in the form of a wired or wireless interface for example. Example processing circuitry can include but is not limited to communications circuitry such as wireless communication devices, for example WiFi devices. Example communications circuitry can be a mini computer equipped with a WiFi connection.

Processing circuitry may comprise circuitry configured to implement desired programming provided by appropriate media in at least one embodiment. For example, processing circuitry may be implemented as one or more of a processor and/or other structure configured to execute executable instructions including, for example, software and/or firmware instructions, and/or hardware circuitry. Exemplary embodiments of processing circuitry include hardware logic, PGA, FPGA, ASIC, state machines, and/or other structures alone or in combination with a processor. These examples of processing circuitry are for illustration and other configurations are possible.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Example programming including processor-usable code may be communicated as a data signal embodied in a carrier wave in but one example.

Storage circuitry may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, storage circuitry may store programming implemented by the processing circuitry.

The user interface is configured to interact with a user including conveying data to a user (e.g., displaying data for observation by the user, audibly communicating data to a user, etc.) as well as receiving inputs from the user (e.g., tactile input, voice instruction, etc.). Accordingly, in one example embodiment, the user interface may include a display (e.g., cathode ray tube, LCD, etc.) configured to depict visual information and an audio system as well as a keyboard, mouse and/or other input device. This interface may be integrated with the currency assembly, for example. Any other suitable apparatus for interacting with a user may also be utilized.

The circuitry operatively coupled to one or more of the air assembly, the sealant tank, the currency operating assembly, and/or the valve. Via the interface, information such as one or more of sealant amount, currency received, and/or credit card information can be provided to remote computers.

Assembly 50 can also include a clean out assembly associated with the air assembly and the tire sealant container. Accordingly, pressure unit clean out assembly 56 can be coupled via pressure unit clean out connection 64 to flow meter 57 which can be operatively coupled to air assembly 52.

Assembly 50 can also include a temperature control assembly, such as temperature control 55, operatively coupled to the tire sealant tank 51 and/or conduits associated with same.

Flow meters such as flow meter 57 operatively coupled to the outlet of the tire sealant tank as well as assemblies 52 and 56.

Assembly 50 can also include a scale 53 that may be operatively engaged with tank 51 to acquire data relating to amount of sealant used/available. This data may be acquired/processed with circuitry 70. Scale 53 can include a volume sensor, and/or sealant levels may be monitored by weight float system, visual window, for example. Time flow controller 54 may be utilized to regulate flow of sealant and/or temperature control of assembly 50 thereby providing heat at night and/or cooling during the day.

Connections 58, 60, 61, 62, and/or 63 can be utilized to operatively connect the assemblies. The operative connection can include fluid conduit and electrical conduit for example.

Assemblies of the present disclosure may be provided as a stand alone unit, requiring only a power supply to operate or components of the assemblies can be provided to already existing units and the existing units reconfigured.

In accordance with the assemblies provided, methods for repairing tires can include providing tire sealant to a tire from a tire repair assembly upon depositing currency in the tire repair assembly. In accordance with an example aspect, after providing the sealant, flushing any remaining sealant from any conduits used to provide the sealant can be performed.

The tire sealant can be maintained in a fluid state by controlling the temperature, for example and this control may be performed according to a predetermined plan or as instructed remotely, for example. As another example of remote control, upon the providing sealant, processing circuitry can signal a remote computer processing system as to the status of the tire repair assembly. This can also be performed periodically and data can be exchanged between two systems, such data can include tire sealant amount available/used and/or currency received.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A tire repair assembly comprising:
    a tire sealant tank;
    an air assembly coupled to the tire sealant tank;
    a valve configured to control fluid communication between the tank and the air assembly;
    a flow meter coupled to the air assembly;
    a clean out assembly coupled to the flow meter; and
    a currency operating assembly configured to control the valve.

2. The tire repair assembly of claim 1 wherein the tire sealant tank contains a suspension of flakes and fine fibers in a liquid, and/or a natural or synthetic liquid rubber.

3. The tire repair assembly of claim 1 wherein the tire sealant tank contains latex.

4. The tire repair assembly of claim 1 further comprising computer processing circuitry operatively coupled to one or more of the air assembly, the sealant tank, the currency operating assembly, the flow meter, the clean out assembly, and/or the valve.

5. The tire repair assembly of claim 4 wherein the computer processing circuitry further comprises a communications interface.

6. The tire repair assembly of claim 5 wherein the communications interface is configured to provide and/or receive information wirelessly.

7. The tire repair assembly of claim 6 wherein the information comprises one or more of sealant amount, currency received, and/or credit card information.

8. The tire repair assembly of claim 1 wherein the currency operating assembly is electronically coupled to the flow meter.

9. The tire repair assembly of claim 1 further comprising a temperature control assembly operatively coupled to the tire sealant tank and/or conduits associated with same.

10. The tire repair assembly of claim 1 further comprising computer processing circuitry operatively coupled to:
    the currency operating assembly;
    the flow meter;
    the clean out assembly; and
    the valve.

11. A method for repairing tires, the method comprising:
    providing a tire repair assembly comprising:
        an air assembly coupled to a tire sealant tank via a valve configured to control fluid communication between the tank and the air assembly;
        a flow meter coupled to the air assembly;
        a clean out assembly coupled to the flow meter; and
        computer processing circuitry operatively coupled to:
            the flow meter;
            the clean out assembly; and
            the valve;
    providing air from the air assembly to the tire sealant tank to provide air and sealant through the flow meter and then to a first tire;
    after providing air and sealant to the tire, engaging the clean our assembly to clean out conduit between the flow meter and the tire; and
    after engaging the clean out assembly, again providing air from the air assembly to the tire sealant tank to provide air and sealant through the flow meter and then to a second tire, the first tire being different from the second tire.

12. The method of claim 11 wherein the engaging the clean out assembly comprises flushing any remaining sealant from any conduits used to provide the sealant.

13. The method of claim 11 further comprising, providing heat to the tire sealant tank to maintain the tire sealant within the tire repair assembly in a fluid state.

14. The method of claim 11 further comprising, providing a scale coupled to the tire sealant tank and measuring the amount of tire sealant available for the providing.

15. The method of claim 11 further comprising, using the flow meter to measure the amount of tire sealant provided.

16. The method of claim 11 further comprising, using the processing circuitry to signal a remote computer processing system as to the status of the tire repair assembly.

17. The method of claim 11 further comprising using the processing circuitry to periodically communicate data with a remote computer from the tire repair assembly.

18. The method of claim 12 wherein the data comprises currency received and/or tire sealant amount.

19. The method of claim 11 further comprising controlling the tire repair assembly from a remote computer, the controlling altering the temperature of the tire repair assembly.

20. A stand alone currency operated tire repair assembly, the assembly comprising:
    a tire sealant tank;
    an air compressor operatively coupled to the tank;
    a valve operatively aligned between the tank and the air compressor;
    a flow meter operatively aligned between the tank and the air compressor;
    a clean out assembly coupled to the flow meter; and
    computer processing circuitry operatively coupled to the air compressor, the valve, the clean out assembly, and the flow meter.

* * * * *

UNITED STATES PATENT AND TRADEMARK OFFICE
CERTIFICATE OF CORRECTION

| | | |
|---|---|---|
| PATENT NO. | : 9,259,982 B2 | Page 1 of 1 |
| APPLICATION NO. | : 13/835369 | |
| DATED | : February 16, 2016 | |
| INVENTOR(S) | : Robert W. Paasch | |

It is certified that error appears in the above-identified patent and that said Letters Patent is hereby corrected as shown below:

On the title page,

Item (57) Abstract, line 9 – Replace "A stand alone currency operated tire repair assemblies are also provided" with --Stand alone currency operated tire repair assemblies are also provided--

In the specification,

Column 1, line 33 – Replace "they may in for" with --they may be in for--

Column 1, line 49 – Replace "A stand alone" with --Stand alone--

Column 2, line 25 – Replace "varying viscus coagulating property's" with --varying viscous coagulating properties--

Column 2, line 26 – Replace "Control of value 16" with --Control of valve 16--

Column 4, lines 58-59 – Replace "monitored by weight float system, visual window" with --monitored by a weight float system, or visual window--

In the claims,

Column 6, line 20 – Replace "clean our assembly" with --clean out assembly--

Column 6, line 45 – Replace "method of claim 12" with --method of claim 17--

Signed and Sealed this
Twenty-first Day of June, 2016

Michelle K. Lee
*Director of the United States Patent and Trademark Office*